(12) United States Patent
Webb et al.

(10) Patent No.: US 8,061,922 B2
(45) Date of Patent: Nov. 22, 2011

(54) APPARATUS AND METHODS FOR ASSEMBLING SEPARATE COMPONENTS

(75) Inventors: Keith D. Webb, Liberty Hill, TX (US); Steven J. Zielnicki, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 961 days.

(21) Appl. No.: 11/998,268

(22) Filed: Nov. 29, 2007

(65) Prior Publication Data

US 2009/0142129 A1    Jun. 4, 2009

(51) Int. Cl.
*F16L 41/00* (2006.01)
(52) U.S. Cl. .................. 403/242; 403/280; 403/282
(58) Field of Classification Search .......... 403/242, 403/274, 278, 279, 280, 282; 24/614, 615; 361/679.02; 312/223.2, 111, 140
See application file for complete search history.

(56) References Cited

U.S. PATENT DOCUMENTS

| | | | |
|---|---|---|---|
| 2,981,669 A * | 4/1961 | Brand et al. .................. | 403/282 |
| 6,075,694 A | 6/2000 | Mills et al. | |
| 6,337,793 B1 | 1/2002 | Vier et al. | |
| 6,761,502 B2 * | 7/2004 | Bishop et al. ................. | 403/278 |
| 6,862,913 B2 | 3/2005 | Lempenauer et al. | |
| 2003/0115927 A1 | 6/2003 | Lempenauer et al. | |

OTHER PUBLICATIONS

Tox Pressotechnik, "TOX Joining Systems", Printed From Internet on Jul. 10, 2007, 12 pgs.
BTM Corporation, "Tog-L-Loc Configurations", Printed From Internet on Jul. 10, 2007; 4 pgs.
BTM Corporation, "Tog-L-Loc 940 Series", Printed From Internet on Jul. 10, 2007, 4 pgs.
Tox, "TOX Sheet Metal Joining Systems: Riveting Without Rivets", Printed From Internet on Jul. 10, 2007, 3 pgs.
BTM Corporation, "Tog-L-Loc Equipment", Printed From Internet on Jul. 10, 2007, 2 pgs.
BTM Corporation, "Tog-L-Loc Applications", Printed From Internet on Jul. 10, 2007, 3 pgs.
BTM Corporation, "Tog-L-Loc Joint Data", Printed From Internet on Jul. 10, 2007, 6 pgs.
BTM Corporation, "Tog-L-Loc Characteristics", Printed From Internet on Jul. 10, 2007, 2 pgs.
BTM Corporation, "Tog-L-Loc How It Works", Printed From Internet on Jul. 10, 2007, 2 pgs.
BTM Corporation, "Tog-L-Loc Sheet Metal Joining System", Printed From Internet on Jul. 10, 2007, 2 pgs.

* cited by examiner

*Primary Examiner* — Victor MacArthur
(74) *Attorney, Agent, or Firm* — O'Keefe, Egan, Peterman & Enders LLP (57) ABSTRACT

Apparatus and methods for assembling together separate components, such as a first substantially flat sheet metal component to a second substantially flat sheet metal component, in substantially perpendicular relationship. A first latch component body may have an elongated displaceable latch member provided on a first edge of the first latch component body that is configured to be received and latchably retained within a latch reception opening of a second latch component body that is of complementary shape and dimensions to receive the displaceable latch member. The displaceable latch member may be displaced to an extended position while inserted within the latch reception opening to extend a first latch extension surface of the displaceable latch member outwardly and away from a second latch extension surface of the displaceable latch member such that the first latch extension surface latchably engages a first latch retention surface of the latch reception opening and such that the second latch extension surface latchably engages a second latch retention surface of the latch reception opening to latch the first latch component body to the second latch component body.

30 Claims, 10 Drawing Sheets

APPARATUS AND METHODS FOR ASSEMBLING SEPARATE COMPONENTS

FIELD OF THE INVENTION

This invention relates generally to component assembly and, more particularly, to apparatus and methods for assembling together separate components.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Separate components and materials have been joined together using a variety of different apparatus and methods. Examples of such apparatus and methods include surgical staples and apparatus configured to join automotive, building and appliance assemblies, and forming operations for joining seams or edges together. More particularly, parallel sheets of metal have been joined together for automotive and other industries using cylindrical rivet-like fasteners that extend perpendicularly from a first sheet of metal that may be provided in the form of a flange through a corresponding opening in an adjacent and parallel sheet of metal where the fastener is securely held in order to join the flange to the adjacent sheet of metal. Adjacent parallel sheets of metal have also been joined using a punch and die process to form a round projection joint that joins the material of the two adjacent parallel sheets of metal. Spot welding methods have also been employed to join adjacent parallel sheets of metal.

Figure 1:
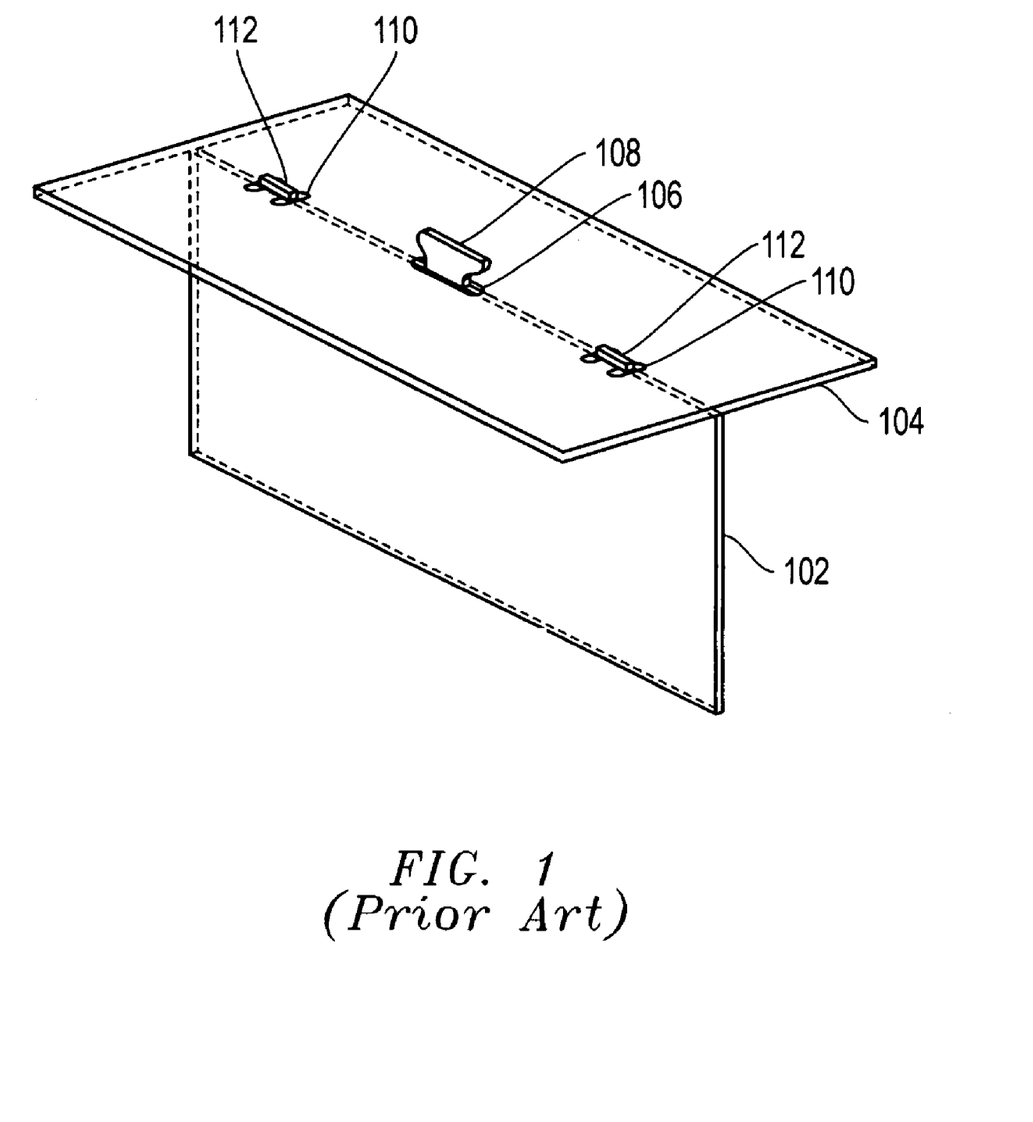
FIG. 1 illustrates a perspective view of an assembly of the prior art.
Figure 2:
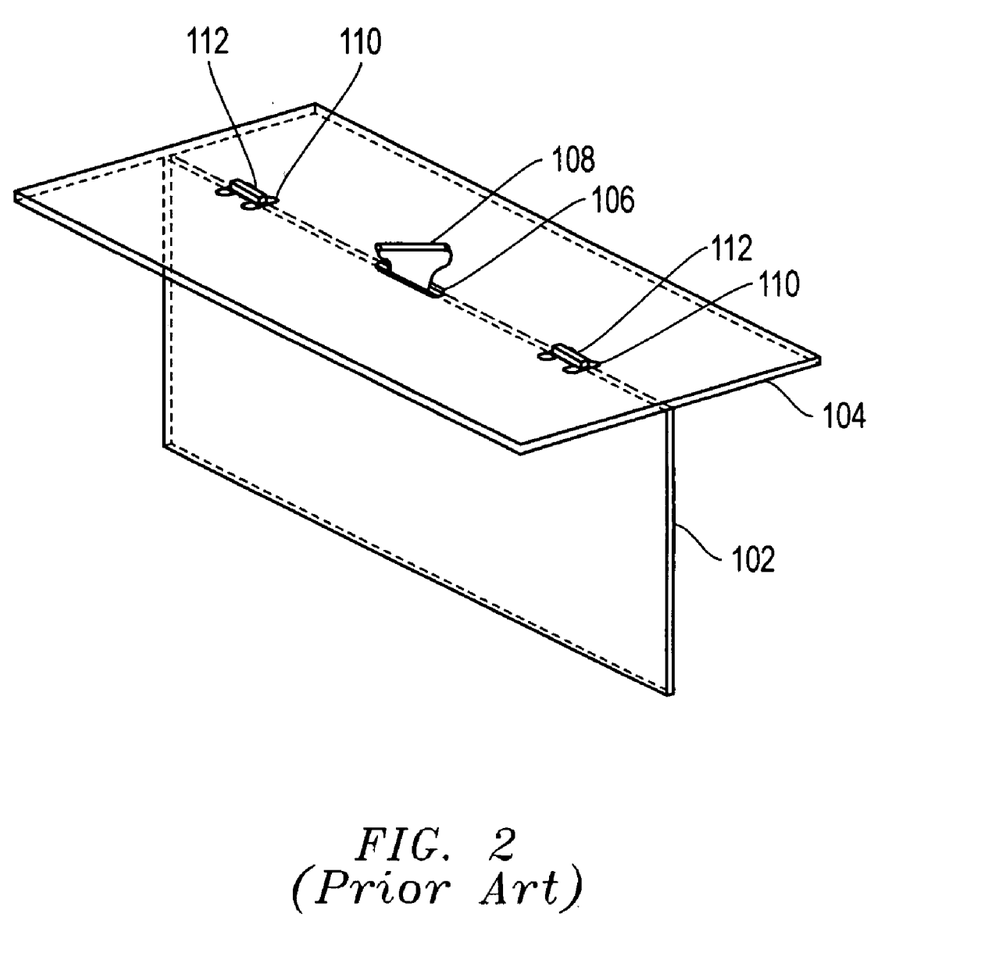
FIG. 2 illustrates a perspective view of an assembly of the prior art.

Metal sheets have also been assembled together as components of information handling systems, e.g., sheet metal walls and partitions are commonly used in chassis enclosures and for mounting components of an information handling system. For example, a first piece of sheet metal may be joined in perpendicular fashion to a second piece of sheet metal to form a mounting bay shelf for a desktop information handling system, which may be used to mount and support disk drives or other internal components of the information handling system. FIG. 1 illustrates one assembly method that has been employed to join a first metal sheet 102 in perpendicular orientation to a second metal sheet 104 during the assembly of a desktop information handling system. In the illustrated assembly of FIG. 1, the second metal sheet 104 may be taken to represent a supporting wall within an information handling system and the first metal sheet 102 may be taken to represent a cross-member or shelf of a mounting bay that is mounted perpendicular to second metal sheet 104 as shown. As shown in FIG. 1, second metal sheet 104 includes two spaced openings 110 that are provided to receive two spaced tabs 112 that are provided on an edge of first metal sheet 102. Second metal sheet 104 also includes a third opening 106 that is provided to receive twist tab 108 that is provided on the edge of first metal sheet 102. As shown, first sheet metal 102 is joined perpendicularly to second sheet metal 104 by insertion of tabs 112 into corresponding openings 110 and insertion of twist tab 108 into opening 106. When so inserted, tabs 112 serve to locate and orient first metal sheet 102 in a desired position relative to second metal sheet 104, and twist tab 108 serves to retain first metal sheet 102 in this inserted position relative to second metal sheet 104 when tab 108 is twisted as shown in FIG. 2. In this regard, twist tab 108 is provided with angled sides that contact and bind against the edges of slot 106 when tab 108 is twisted in a manner that serves to pull and retain first metal sheet 102 against second metal sheet 104.

Figure 3:
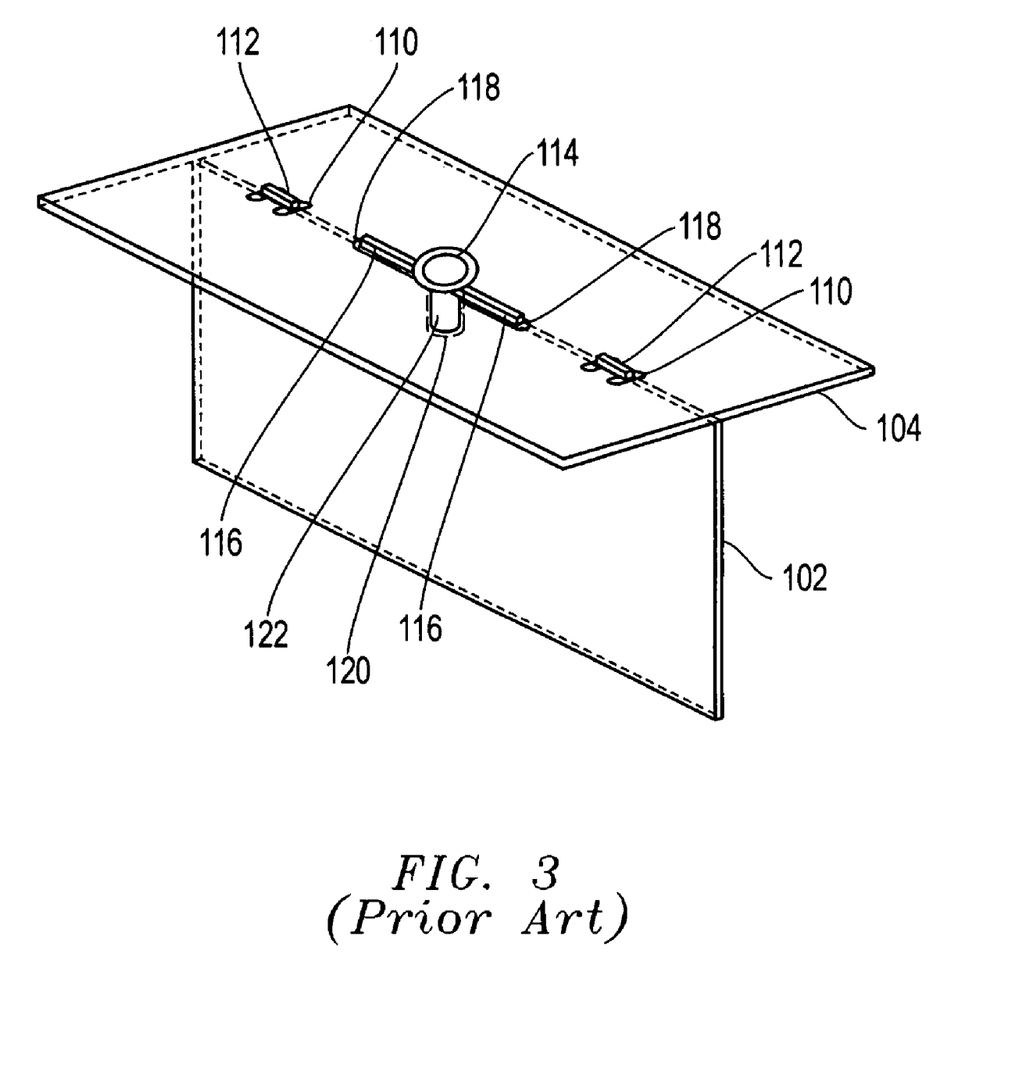
FIG. 3 illustrates a perspective view of an assembly of the prior art.

FIG. 3 shows another assembly method that has been employed to join a first metal sheet 102 in perpendicular orientation to a second metal sheet 104 during the assembly of a desktop information handling system. As with the assembly of FIGS. 1 and 2, second metal sheet 104 of FIG. 3 also includes two spaced openings 110 that are provided to receive two spaced tabs 112 that are provided on an edge of first metal sheet 102. However, second metal sheet 104 also includes a third opening 118 that is provided to receive elongated tab segments 116 that are provided on the edge of first metal sheet 102. As shown, first sheet metal 102 is joined perpendicularly to second sheet metal 104 by insertion of tabs 112 into corresponding openings 110 and insertion of elongated tab segments 116 into opening 118. When so inserted, tabs 112 and 116 serve to locate and orient first metal sheet 102 in a desired position relative to second metal sheet 104. A rivet 114 is then inserted through opening 118 and used to secure first metal sheet 102 in this inserted position relative to second metal sheet 104. A cutout 120 is provided in the edge of first metal sheet 102 as shown to receive the body of rivet 114.

SUMMARY OF THE INVENTION

Disclosed herein are apparatus and methods for assembling together separate components, for example, to assemble and fasten a first substantially flat sheet metal component to a second substantially flat sheet metal component in substantially perpendicular relationship. In one embodiment, the disclosed apparatus and methods may include a first latch component body having an elongated displaceable latch member provided on a first edge of the first latch component body that is configured to be received and latchably retained within a latch reception opening of a second latch component body that is of complementary shape and dimensions to receive the displaceable latch member. In this regard, the displaceable latch member may be displaced to an extended position while inserted within the latch reception opening to extend a first latch extension surface of the displaceable latch member outwardly and away from a second latch extension surface of the displaceable latch member such that the first latch extension surface latchably engages a first latch retention surface of the latch reception opening and such that the second latch extension surface latchably engages a second latch retention surface of the latch reception opening to latch the first latch component body to the second latch component body.

Advantageously, the disclosed apparatus and methods may be implemented in one exemplary embodiment to assemble a first component to a second component while requiring no dedicated volume for a separate fastener, and in a manner that shortens tolerance loops and/or requires no additional hardware (e.g., requiring no separate alignment features for tight tolerances). Additionally, in one embodiment, a displaceable latch member and its corresponding latch reception opening may be implemented in a manner that also provides an alignment function (e.g., location and orientation) between two joined components without the need for separate alignment features. Thus, the disclosed apparatus and methods may implemented to simplify design (e.g., utilizing tab, slot and attach in one feature) over conventional joining and fastening methods.

In another exemplary embodiment, multi-directional access may be provided to allow a first component to be latched to a second component by application of force from one of two or more possible directions (e.g., allowing use of a fastening tool from one of multiple possible directions so as to reduce limitations imposed by clearance needed for use of the fastening tool), thus enhancing installation flexibility. This enhanced flexibility may be used, for example, to allow components such as design partitions and walls to be assembled and joined from the same side in a manner that solves blind assembly (assembly from far side) issues. Further, the disclosed apparatus and methods may be implemented utilizing less space than conventional assembly techniques, which is advantageous in view of the increasing number of features and components in information handling systems and other multi-component systems used today. Additionally, certain exemplary embodiments of the disclosed apparatus and methods may be implemented in a manner that requires less force to be applied to join separate components, e.g., allowing use of hand held tool and manual human-applied force to latch separate opponents together without use of hydraulic punch or other automated force application required by some conventional methods.

In one respect, disclosed herein is a latching assembly, including a first latch component body having a displaceable latch member provided on a first edge of the first latch component body with a latch member opening defined in the first latch component body adjacent the deformable latch member, the displaceable latch member having a first latch extension surface provided on a first end of the displaceable latch member and a second latch extension surface provided on a second and opposite end of the displaceable latch member, the displaceable latch member being displaceable between an unextended position and an extended position so as to extend the first and second latch extension surfaces outwardly and away from each other. The latching assembly of this embodiment further includes a second latch component body having a latch reception opening defined therein with a first latch retention surface provided on a first internal edge of the latch reception opening and a second latch retention surface provided on a second and opposite internal edge of the latch reception opening. The displaceable latch member of the first latch component body is configured in this embodiment to be insertable into the latch reception opening from a first side of the second latch component body when the displaceable latch member is disposed in the unextended position with the first latch extension surface of the displaceable latch member disposed adjacent the first latch retention surface of the latch reception opening and with the second latch extension surface of the displaceable latch member disposed adjacent the second latch retention surface of the latch reception opening. The displaceable latch member is also dimensioned in this embodiment to be latchably retained within the latch reception opening to prevent removal of the displaceable latch member in a direction outward from the first side of the second latch component body when the displaceable latch member is displaced to the extended position while inserted within the latch reception opening to extend the first latch extension surface of the displaceable latch member outwardly and away from the second latch extension surface such that the first latch extension surface latchably engages the first latch retention surface of the latch reception opening and the second latch extension surface latchably engages the second latch retention surface of the latch reception opening to latch the first latch component body to the second latch component body.

In another respect, disclosed herein is a method of assembling together multiple components, including providing a first latch component body having a displaceable latch member provided on a first edge of the first latch component body with a latch member opening defined in the first latch component body adjacent the deformable latch member, the displaceable latch member having a first latch extension surface provided on a first end of the displaceable latch member and a second latch extension surface provided on a second and opposite end of the displaceable latch member, the displaceable latch member being displaceable between an unextended position and an extended position so as to extend the first and second latch extension surfaces outwardly and away from each other. The method of this embodiment further includes providing a second latch component body having a latch reception opening defined therein with a first latch retention surface provided on a first internal edge of the latch reception opening and a second latch retention surface provided on a second and opposite internal edge of the latch reception opening. The method of this embodiment also includes inserting the displaceable latch member of the first latch component body into the latch reception opening from a first side of the second latch component body when the displaceable latch member is disposed in the unextended position such that the first latch extension surface of the displaceable latch member is disposed adjacent the first latch retention surface of the latch reception opening and such that the second latch extension surface of the displaceable latch member is disposed adjacent the second latch retention surface of the latch reception opening. The method of this embodiment also includes displacing the displaceable latch member to the extended position while the displaceable latch member is inserted within the latch reception opening to extend the first latch extension surface of the displaceable latch member outwardly and away from the second latch extension surface such that the first latch extension surface latchably engages the first latch retention surface of the latch reception opening and the second latch extension surface latchably engages the second latch retention surface of the latch reception opening to prevent removal of the displaceable latch member in a direction outward from the first side of the second latch component body and to latch the first latch component body to the second latch component body.

In another respect, disclosed herein is an assembly, including a first latch component body having a displaceable latch member provided on a first edge of the first latch component body with a latch member opening defined in the first latch component body adjacent the deformable latch member, the displaceable latch member having a first latch extension surface provided on a first end of the displaceable latch member and a second latch extension surface provided on a second and opposite end of the displaceable latch member, the displaceable latch member being displaceable between an unextended position and an extended position so as to extend the first and second latch extension surfaces outwardly and away from each other. The assembly of this embodiment also includes a second latch component body having a latch reception opening defined therein with a first latch retention surface provided on a first internal edge of the latch reception opening and a second latch retention surface provided on a second and opposite internal edge of the latch reception opening. The displaceable latch member of the first latch component body of this embodiment is also positioned within the latch reception opening from a first side of the second latch component body and is latchably retained within the latch reception opening to prevent removal of the displaceable latch member in a direction outward from the first side of the second latch component body, the displaceable latch member being displaced to the extended position and the first latch extension surface of the displaceable latch member extending outwardly and away from the second latch extension surface so that the first latch extension surface latchably engages the first latch retention surface of the latch reception opening and so that the second latch extension surface latchably engages the second latch retention surface of the latch reception opening to latch the first latch component body to the second latch component body.

In another respect, disclosed herein is a latch component body including a displaceable latch member provided on a first edge of the first latch component body with a latch member opening defined in the first latch component body adjacent the deformable latch member, the displaceable latch member having a first latch extension surface provided on a first end of the displaceable latch member and a second latch extension surface provided on a second and opposite end of the displaceable latch member, the displaceable latch member being displaceable from the latch member opening between an unextended position and an extended position so as to extend the first and second latch extension surfaces outwardly and away from each other. The displaceable latch member of the first latch component body of this embodiment is configured to be insertable into a latch reception opening defined in a second latch component body and having a first internal edge and a second internal edge opposite the first internal edge, the latch reception opening having a first latch retention surface provided on the first internal edge and a second latch retention surface provided on the second internal edge of the latch reception opening. The displaceable latch member of the first latch component body of this embodiment is also configured to be insertable into the latch reception opening from a first side of the second latch component body when the displaceable latch member is disposed in the unextended position with the first latch extension surface of the displaceable latch member disposed adjacent the first latch retention surface of the latch reception opening and with the second latch extension surface of the displaceable latch member disposed adjacent the second latch retention surface of the latch reception opening. The displaceable latch member of this embodiment is also dimensioned to be latchably retained within the latch reception opening to prevent removal of the displaceable latch member in a direction outward from the first side of the second latch component body when the displaceable latch member is displaced to the extended position while inserted within the latch reception opening to extend the first latch extension surface of the displaceable latch member outwardly and away from the second latch extension surface such that the first latch extension surface latchably engages the first latch retention surface of the latch reception opening and the second latch extension surface latchably engages the second latch retention surface of the latch reception opening to latch the first latch component body to the second latch component body.

DESCRIPTION OF ILLUSTRATIVE EMBODIMENTS

Figure 4A:
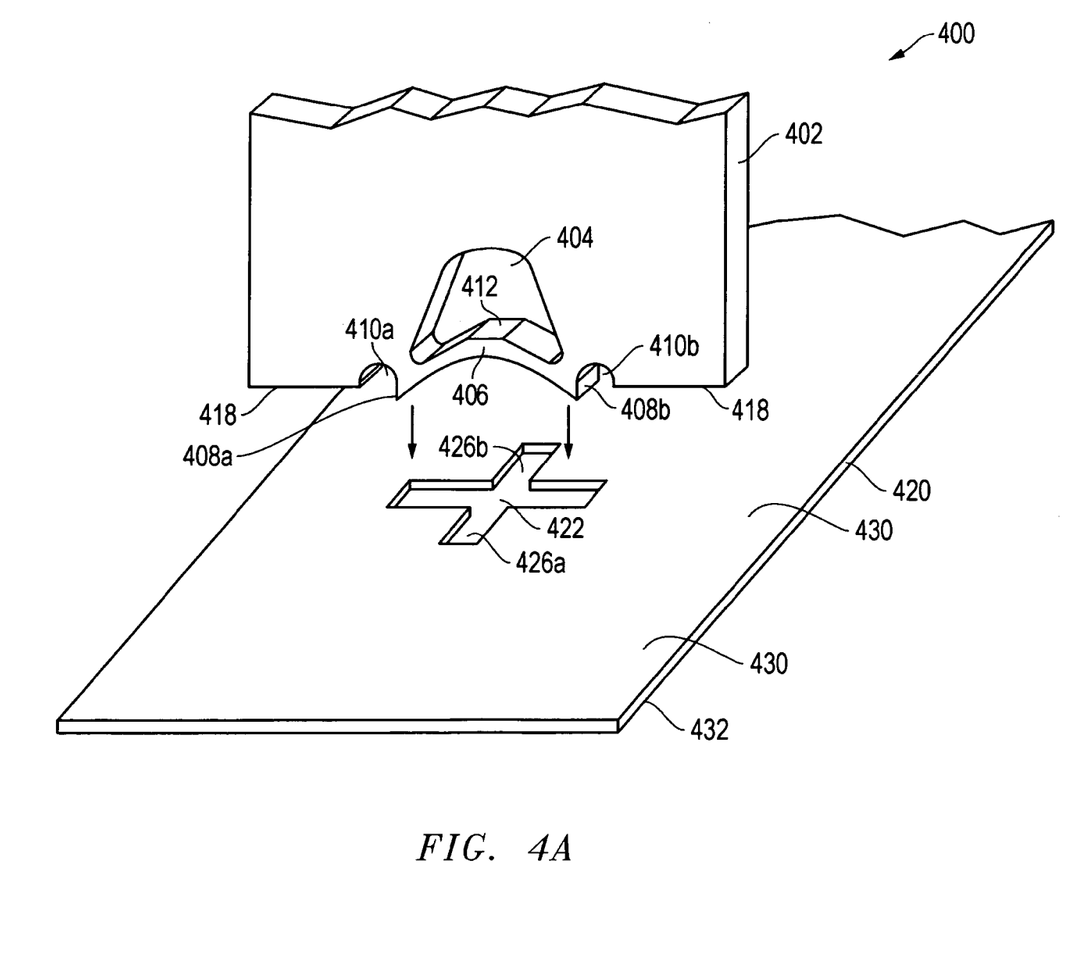
FIG. 4A is a perspective view of a latching assembly according to one exemplary embodiment of the disclosed apparatus and methods.
Figure 4B:
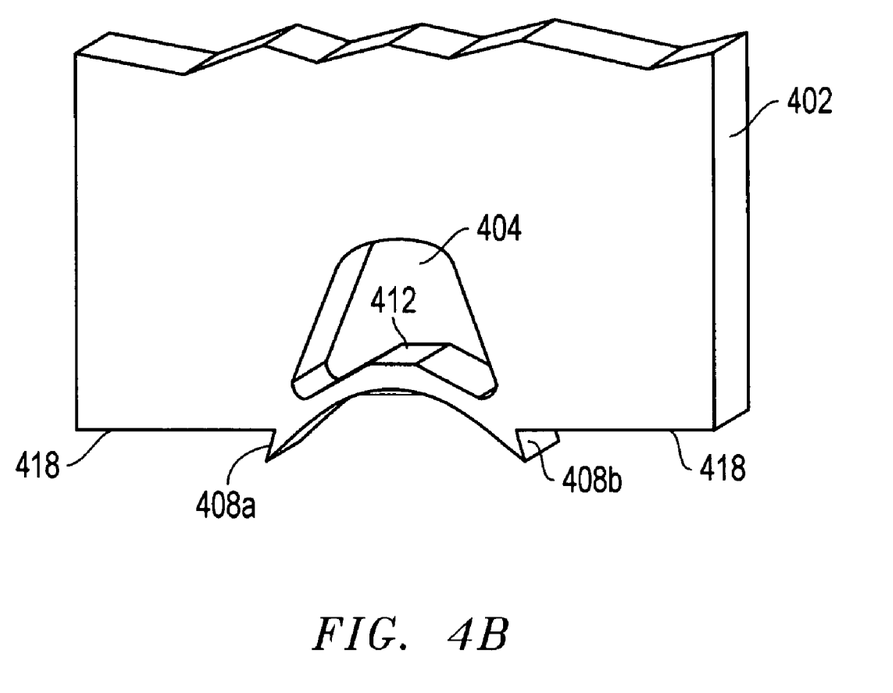
FIG. 4B is a perspective view of a latch component body according to one exemplary embodiment of the disclosed apparatus and methods.
Figure 5A:
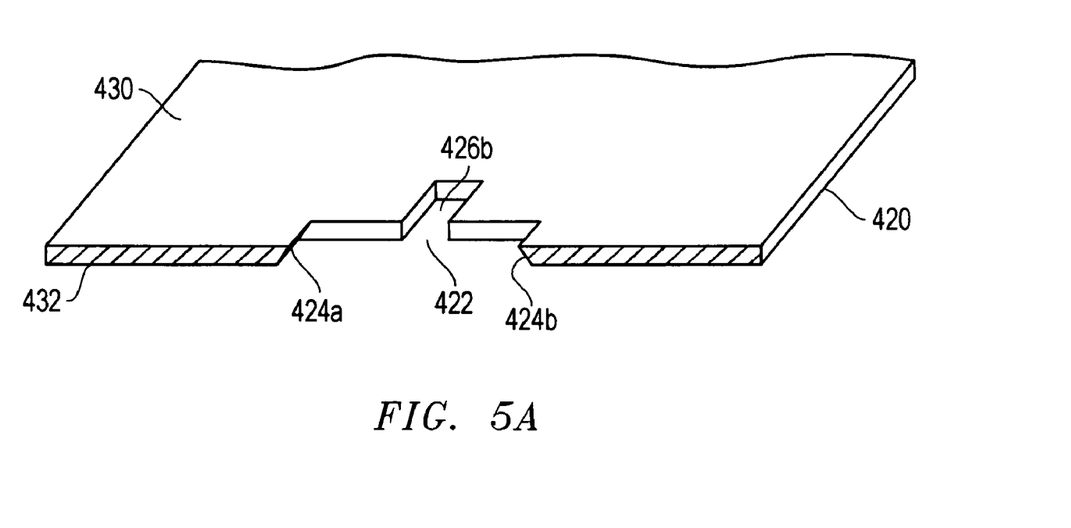
FIG. 5A is a cross sectional perspective view of a latch component body according to one exemplary embodiment of the disclosed apparatus and methods.
Figure 5B:
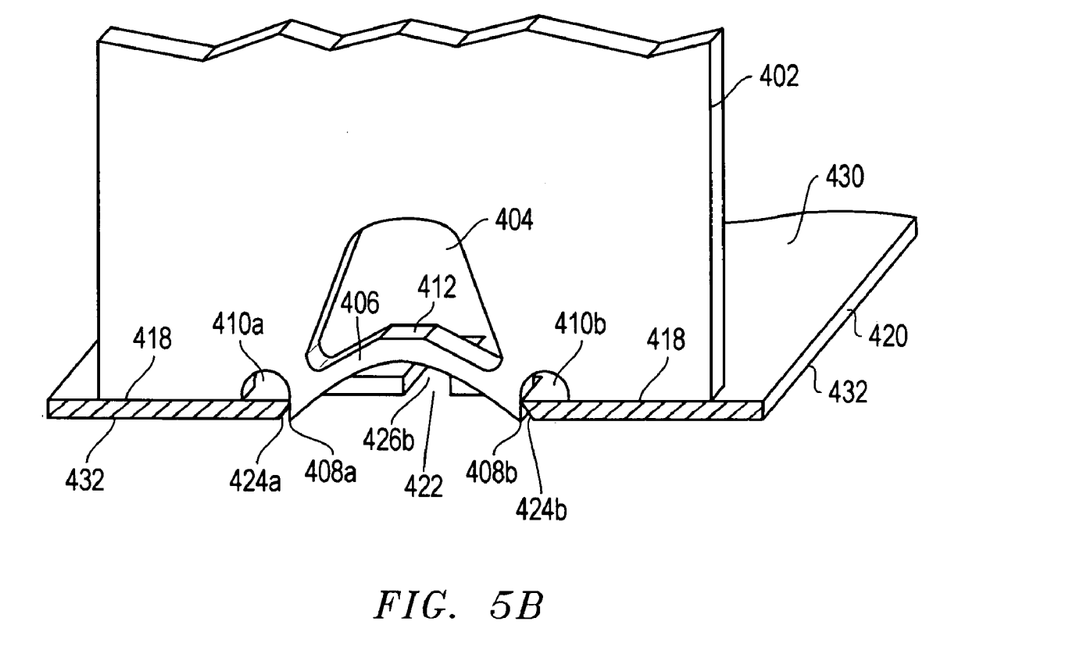
FIG. 5B is a cross sectional perspective view of a latching assembly according to one exemplary embodiment of the disclosed apparatus and methods.
Figure 6A:
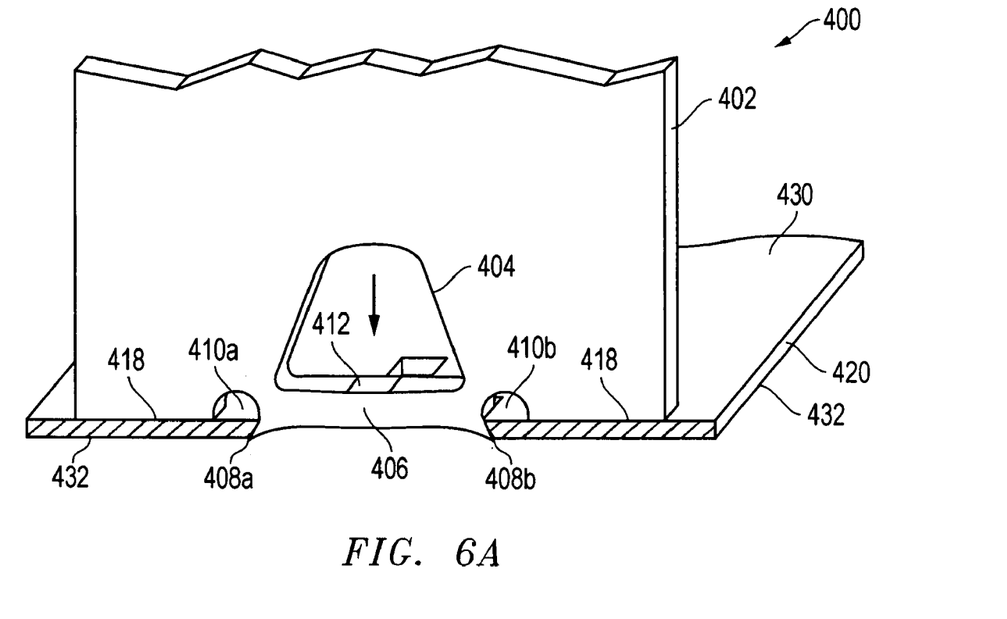
FIG. 6A is a cross sectional perspective view of a latching assembly according to one exemplary embodiment of the disclosed apparatus and methods.
Figure 6B:
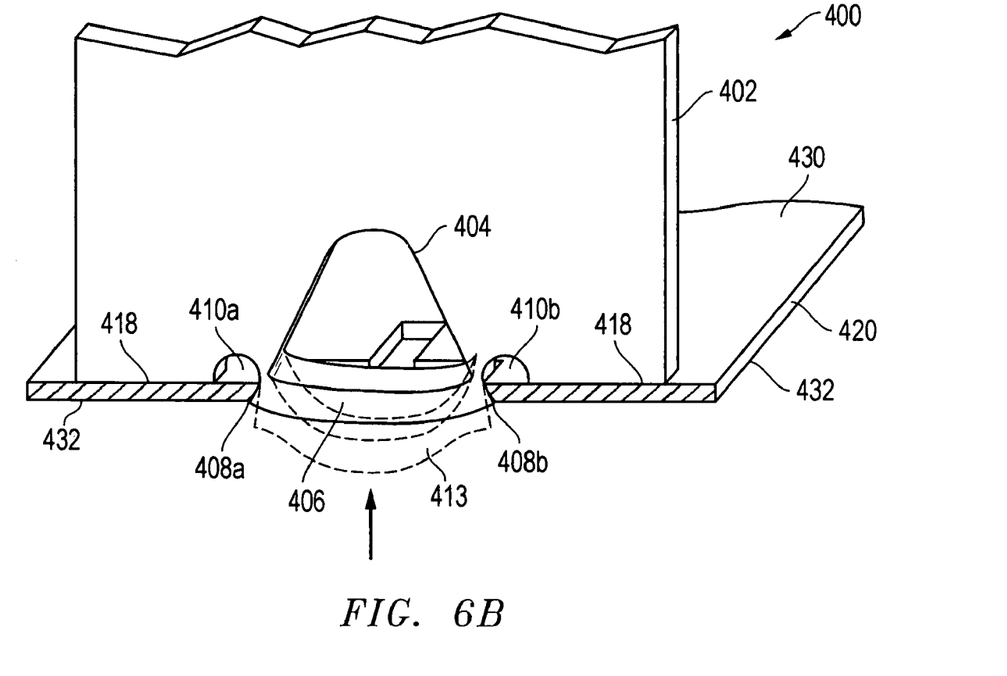
FIG. 6B is a cross sectional perspective view of a latching assembly according to one exemplary embodiment of the disclosed apparatus and methods.

FIGS. 4-6 illustrate a latching assembly 400 as it may be employed to latch together a first latch component body 402 in the form of a first substantially flat sheet metal component to a second latch component body 420 in the form of a second substantially flat sheet metal component in substantially perpendicular relationship, i.e., in a manner such that a plane of the first substantially flat sheet metal components disposed perpendicular to a plane of the second substantially flat sheet metal component. As shown in FIG. 4, first latch component body 402 has an elongated displaceable latch member 406 provided on a first edge of first latch component body 402 with a latch member opening 404 defined in first latch component body 402 adjacent deformable latch member 406 such that latch member 406 is formed by an elongated strip of bendable sheet metal material that is present between the first edge of latch component body 402 and latch member opening 404. As further shown in FIGS. 4-6, second latch component body 420 has a latch reception opening 422 defined therein that is of complementary shape and dimensions so as to receive displaceable latch member 406 when it is inserted into latch reception opening 422 in the direction of the arrows shown in FIG. 4.

As shown in FIGS. 4-6, displaceable latch member 406 has a first latch extension surface 408a provided on a first end of displaceable latch member 406 and a second latch extension surface 408*b* provided on a second and opposite end of displaceable latch member 466. As further illustrated in FIGS. 4-6, latch retention opening 422 is provided with a first latch retention surface 424*a* provided on a first internal edge of latch reception opening 422 and a second latch retention surface 424*b* provided on a second and opposite internal edge of latch reception opening 422. In the illustrated embodiment, each of first latch retention surface 424*a* and second latch retention surface 424*b* are provided in the form of a chamfer surface that is angled outwardly and away from first side 430 of second latch component body 420 and toward second side 432 of second latch component body 420 such that an internal dimension of latch reception opening 422 is wider within second latch component body 420 at second side 432 than it is at first side 430.

As will be further described, displaceable latch member 406 is displaceable between an unextended position and an extended position so as to extend first latch extension surface 408*a* outwardly and away from second latch extension surface 408*b*. In this regard, latch member opening 404 may be of any size and/or shape suitable for defining a displaceable latch member and for providing clearance for application of force (e.g. using a handheld tool such as punch, screwdriver, using an automated tool such as press, etc.) in the direction of the arrow in FIG. 6 onto internal displacement surface 412 of latch member 406 in order to displace displaceable latch member 406 from an unextended inboard position to an extended outboard position. It will be understood that the particular illustrated configuration of internal displacement surface 412 is exemplary and that other configurations are possible. In addition, a displaceable latch member 406 may be configured for displacement in any other suitable direction from an unextended to extended position in order to extend first latch extension surface 408*a* outwardly and away from second latch extension surface 408*b*. For example, FIG. 6B illustrates an alternate exemplary embodiment configured for application of force in the direction of the arrow onto external displacement surface 413 of latch member 406 in order to displace displaceable latch member 406 from an unextended outboard position (shown in dashed outline) to an extended inboard position (shown in solid outline).

In the illustrated embodiment of FIGS. 4-6, latch extension surfaces 408*a* and 408*b* of displaceable latch member 406 are defined on opposite ends of latch member 406 by optional respective latch extension openings 410*a* and 410*b*. In the illustrated embodiment, latch extension openings 410*a* and 410*b* may also serve to provide an internal (e.g., radial or semi-radial) surface about which a latch extension surface 408 of each end of latch member 406 may pivot when it is displaced from unextended to extended position, as may be seen by comparison of unextended position of FIG. 4 to extended position of FIG. 6. It will be understood, however, that latch extension openings may be provided with internal surfaces having other (e.g., non-radial) shapes, or may not be present, as shown in the exemplar embodiment of FIG. 4B.

As may be further seen in FIGS. 4-6, each of latch extension surfaces 408*a* and 408*b* of this exemplary embodiment is provided with a substantially angular tip that extends a distance outward from first latch component body 402 beyond contacting surfaces 418 of first latch component body 402 which are provided for contacting a surface of a first side 430 of second latch component body 420 when displaceable latch member 406 is inserted into said latch reception opening 422 from the first side 430 of second latch component body 420. As will be further described, this outward extension distance may be selected to control the distance to which displaceable latch member 406 extends into (or into and beyond) latch reception opening 422 of second latch component body 420 when in both unextended and extended (i.e., displaced) positions.

FIG. 4A shows first latch component body 402 with displaceable latch member 406 positioned for insertion into latch reception opening 422 of second latch component body 420, and with displaceable latch member 406 in unextended (i.e., undisplaced) position. FIG. 5B shows first latch component body 402 after insertion of its displaceable latch member 406 into latch reception opening 422 of second latch component body 420, with contacting surfaces 418 of first latch component body 402 in contact with first side 430 of second latch component body 420 and with displaceable latch member 406 still in its unextended (i.e., undisplaced) position.

In the illustrated exemplary embodiment of FIGS. 4-6, latch reception opening 422 is defined as an elongated slot having a first axis extending between first and second latch retention surfaces 424*a* and 424*b*, and displaceable latch member 406 comprises an elongated displaceable member having a first axis extending between first and second latch extension surfaces 408*a* and 408*b*. In this embodiment, displaceable latch member 406 has a shape and dimensions complementary to a shape and dimensions of latch reception opening 422 such that displaceable latch member 406 is insertable into latch reception opening 422 only when the first axis of its elongated displaceable member is aligned with the first axis of the elongated slot of latch reception opening 422. It will be understood that a displaceable latch member may have also have a shape and dimensions complementary to any other shape and dimensions of latch reception opening such that the displaceable latch member is insertable into the latch reception opening only when displaceable latch member is selectively oriented relative to the latch reception opening. In this way the relationship between a displaceable latch member and a latch reception opening of the disclosed apparatus and methods may serve the dual purpose of locating and orienting a first latch component body (e.g.; first sheet metal component) relative to a second latch component body (e.g., second sheet metal component), and in one exemplary embodiment without the presence of any other location features such as tabs and corresponding openings for receipt thereof.

FIG. 6 shows displaceable latch member 406 after displacement to its extended position while inserted within latch reception opening 422 such that first latch extension surface 408*a* latchably engages first latch retention surface 424*a* and said second latch extension surface 408*b* latchably engages second latch retention surface 424*b* to latch said first latch component body to said second latch component body with contacting surfaces 418 of first latch component body 402 in contact with first side 430 of second latch component body 420. In this regard, first and second latch extension surfaces 408*a* and 408*b* may be configured as shown to extend outwardly and away from each other to latchably engage respective chamfer latch retention surfaces 424*a* and 424*b* between first side 430 of second latch component body 420 and second side 432 of latch component body 420 when displaceable latch member 406 is displaced so as to latchably retain latch displacement member 406 within latch reception opening 422 to prevent removal of displaceable latch member 406 in a direction outward from first side 430 of second latch component body 420.

Figure 7:
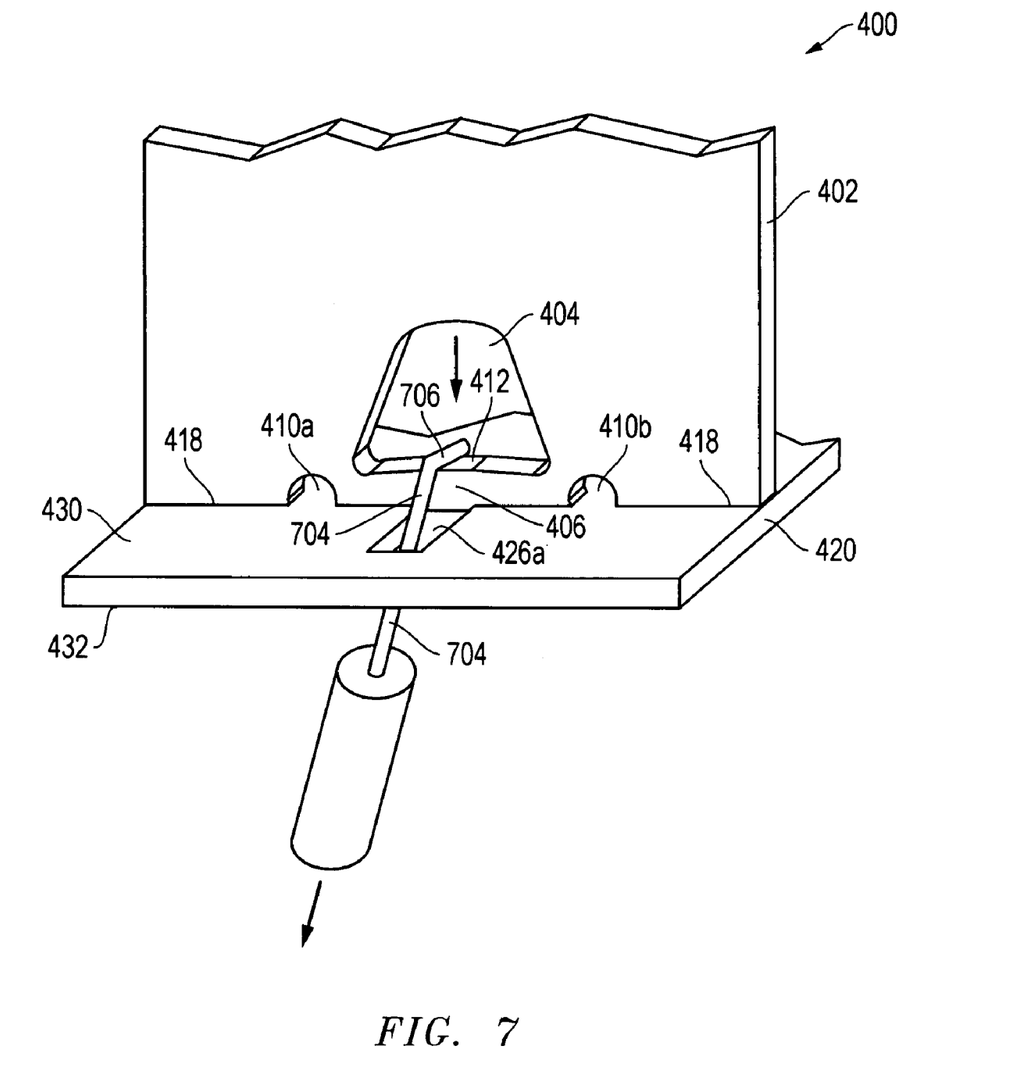
FIG. 7 is a perspective view of a latching assembly according to one exemplary embodiment of the disclosed apparatus and methods.

As previously mentioned, displaceable latch member 406 may be displaced from unextended to extended position by application of force (e.g. using a tool such as punch, screwdriver, etc.) in the direction of the arrow in FIG. 6 onto internal displacement surface 412 of latch member 406. Such a force may be applied in any suitable manner to displaceable latch member 406 and from any direction suitable for displacing displaceable latch member from unextended to extended position, e.g. from the front side (same side as side 430) of second latch component body 420 or from the back side (e.g., same side as side 432 of second latch component body 420. For example, as shown in the exemplary embodiment of FIG. 7, a latch reception opening 422 may be provided with at least one optional open side feature 426 to allow insertion of a tool 704 from the backside of second latch component body 420 to apply a force in the direction of the arrow in FIG. 7 onto internal displacement surface 412 of latch member 406 to displace displaceable latch member 406 from unextended to extended position as shown.

Figure 8:
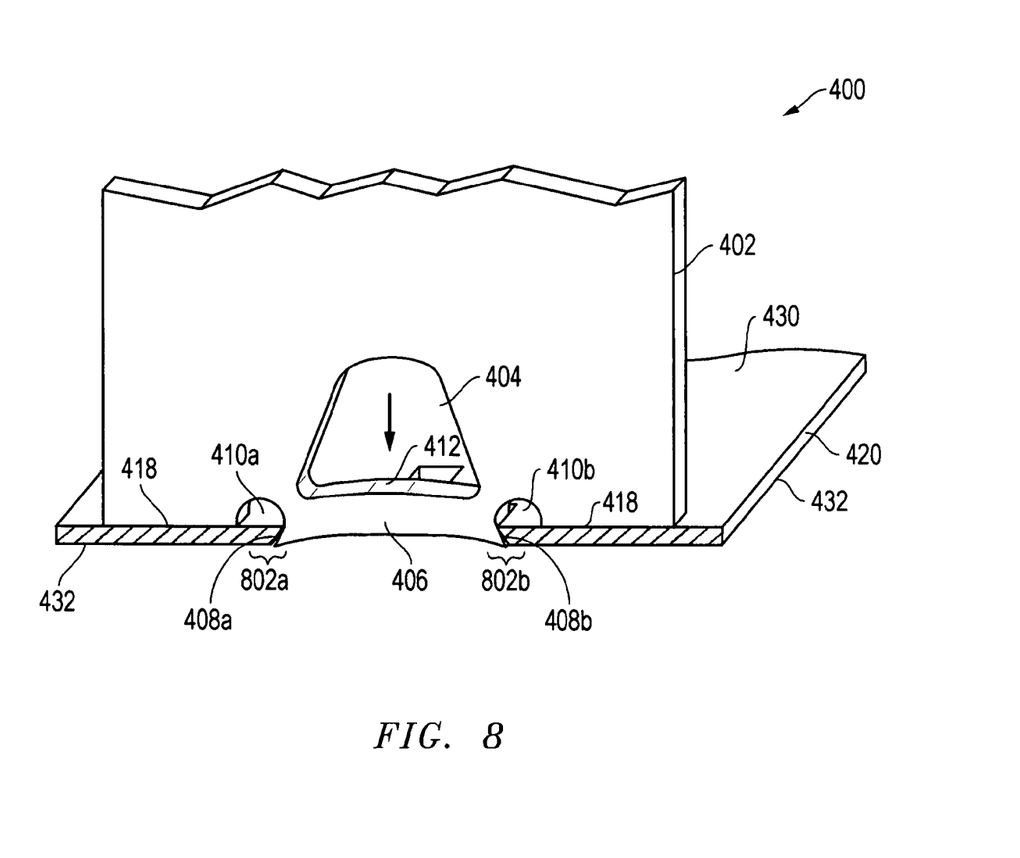
FIG. 8 is a cross sectional perspective view of a latching assembly according to one exemplary embodiment of the disclosed apparatus and methods.

This distance by which each of latch extension surfaces 408a and 408b extends outward from first latch component body 402 may be selected based on requirements of a given application. For example, FIG. 5B and FIG. 6 illustrate an embodiment in which each of latch extension surfaces 408a and 408b of displaceable latch member 406 extend beyond the surface of the second (i.e., opposite) side 432 of second latch component body 420 while in both unextended and extended (i.e., displaced) positions, respectively. Such an embodiment may be desirable where the flushness of the backside of the assembly is not of concern, and/or where maximum latch strength is desired. FIG. 8 illustrates and alternative embodiment where each of latch extension surfaces 408a and 408b of displaceable latch member 406 do not extend any distance outward from first latch component body 402 beyond contacting surfaces 418 of first latch component body 402 when displaceable latch member 406 is inserted into said latch reception opening 422 from the first side 430 of second latch component body 420 and displaceable latch member 406 is displaced to its extended position to latch first latch component body 402 to second latch component body 420. As shown in FIG. 8, this maintains a flush backside (e.g., at areas 802a and 802b of second side 432) for second latch component body 420, which may be a characteristic required or desirable for certain installations.

Figure 9:
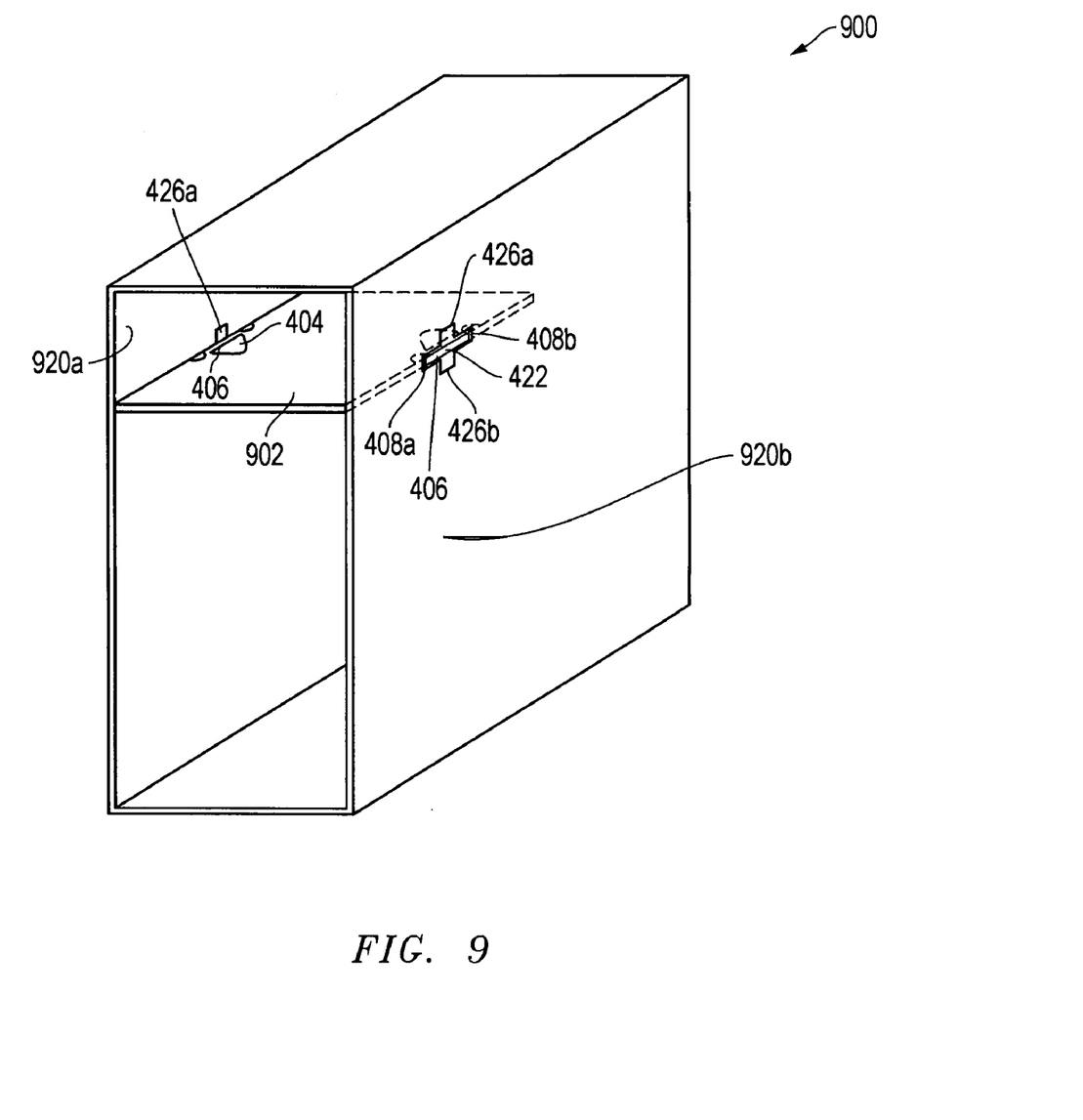
FIG. 9 is a perspective view of information handling system component according to one exemplary embodiment of the disclosed apparatus and methods.

FIG. 9 illustrates one exemplary embodiment of an information handling system chassis enclosure 900 that includes sheet metal walls 920a and 920b and partition component (e.g., shelf) 902 mounted thereto using the disclosed apparatus and methods. As shown in FIG. 9, displaceable latch members 406a and 406b are provided on each of opposite sides of partition component 902, and are received in displaced extended position within respective latch retention openings 422 of respective sheet metal walls 920a and 920b in a manner as described elsewhere herein to retain join opposite edges of partition component 902 in a perpendicular mounted position relative to the interior of sheet metal walls 920a and 920b of chassis enclosure 900. Although FIG. 9 illustrates an information handling system chassis application utilizing sheet metal components, it will be understood that the disclosed apparatus and methods may be employed for joining separate components of other materials in a wide variety of other applications. Moreover, besides bendable sheet metal such as steel, a displaceable latch member may be manufactured of any other bendable material suitable for displacement from an unextended to an extended position to latchably retain the latch displacement member within a latch reception opening in a manner as described herein, e.g., other bendable metals, suitably bendable plastics, etc. Similarly a latch reception opening may be defined in a latch component body of any material suitable for receiving and latchably retaining a latch displacement member in its extended position therein.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A latching assembly system, comprising multiple separate components that are each configured for assembly as a separate component to another separate component to form an assembly, the multiple separate components including:
   a first latch component body having a displaceable latch member provided on a first edge of said first latch component body with a latch member opening defined in said first latch component body adjacent said displaceable latch member, said displaceable latch member having a first latch extension surface provided on a first end of said displaceable latch member and a second latch extension surface provided on a second and opposite end of said displaceable latch member, said displaceable latch member being displaceable in an outward direction away from the first latch component body between an unextended position and an extended position so as to extend said first and second latch extension surfaces outwardly and away from each other; and
   a second latch component body that is a separate latch component body from the first latch component body and that is configured for assembly as a separate component to said first latch component body to form an assembly of the first and second latch components bodies, the second latch component body having opposite first and second sides and having a latch reception opening defined to extend completely through the second latch component body from the first side of the latch component body to the second opposite side of the latch component body with a first latch retention surface provided on a first internal edge of said latch reception opening and a second latch retention surface provided on a second and opposite internal edge of said latch reception opening;

wherein said displaceable latch member of said first latch component body is configured to be insertable into said latch reception opening from the first side of said second latch component body when said displaceable latch member is disposed in said unextended position with said first latch extension surface of said displaceable latch member disposed adjacent said first latch retention surface of said latch reception opening and with said second latch extension surface of said displaceable latch member disposed adjacent said second latch retention surface of said latch reception opening; and wherein said displaceable latch member is dimensioned to be latchably retained within said latch reception opening to prevent removal of said displaceable latch member in a direction outward from said first side of said second latch component body when said displaceable latch member is displaced in an outward direction away from the first latch component body from said unextended position to said extended position while inserted within said latch reception opening to extend said first latch extension surface of said displaceable latch member outwardly and away from said second latch extension surface such that said first latch extension surface latchably engages said first latch retention surface of said latch reception opening and said second latch extension surface latchably engages said second latch retention surface of said latch reception opening to latch said first latch component body to said separate second latch component body in assembled relationship.

2. The system of claim 1, wherein first latch component body comprises a first substantially flat sheet metal component and said second latch component body comprises a second substantially flat sheet metal component such that a plane of first substantially flat sheet metal component of said first latch component body is disposed perpendicular to a plane of said second substantially flat sheet metal component of said second latch component body when said displaceable latch member of said first latch component body is inserted from said first side of said second latch component body into said latch reception opening of said second latch component body and when said first latch extension surface latchably engages said first latch retention surface of said latch reception opening and said second latch extension surface latchably engages said second latch retention surface of said latch reception opening to latch said first latch component body to said second latch component body.

3. The system of claim 1, wherein said displaceable latch member of said first latch component body is configured so that it does not extend outwardly from said second side of said latch component body when said displaceable latch member is displaced to said extended position while inserted within said latch reception opening to latchably retain said displaceable latch member within said latch reception opening of said second latch component body.

4. The system of claim 1, wherein said displaceable latch member has a shape and dimensions complementary to a shape and dimensions of said latch reception opening such that said displaceable latch member is insertable into said latch reception opening when said displaceable latch member is disposed in said unextended position and only when said displaceable latch member is selectively oriented relative to said latch reception opening.

5. The system of claim 4, wherein said latch reception opening is defined as an elongated slot having a first axis extending between said first and second latch retention surfaces; and wherein said displaceable latch member comprises an elongated displaceable member having a first axis extending between said first and second latch extension surfaces and having shape and dimensions complementary to said elongated slot of said latch reception opening such that said displaceable latch member is insertable into said latch reception opening when said displaceable latch member is disposed in said unextended position and only when said first axis of said elongated displaceable member is aligned with said first axis of said elongated slot.

6. The system of claim 5, wherein said latch reception opening is further defined to have at least one open side feature extending outwardly in a direction perpendicular to said first axis of said latch reception opening.

7. The system of claim 1, wherein the first end of said displaceable latch member of said first latch component body is configured to be insertable into said latch reception opening from a first side of said second latch component body; wherein said first latch extension surface is defined on the first end of said displaceable latch member by a first latch extension opening and wherein said second latch extension surface is defined on the second and opposite end of said displaceable latch member by a second latch extension opening; wherein each of said first and second latch retention surfaces each comprise a chamfer surface being angled outwardly and away from said first side of said second latch component body toward the second and opposite side of said second latch component body such that an internal dimension of said latch reception opening is wider within said latch component body at said second side of said second latch component body than at said first side of said latch component body; and wherein said first and second latch extension surfaces are configured to extend outwardly and away from each other to latchably engage said chamfer surface of said respective first and second latch retention surfaces at a point between said first side and said second side of said second latch component body when said displaceable latch member is displaced to said extended position while inserted within said latch reception opening so as to latchably retain said latch displacement member within said latch reception opening to prevent removal of said displaceable latch member in a direction outward from said first side of said second latch component body.

8. The system of claim 1, wherein said first latch component body and said second latch component body each comprise components of an information handling system.

9. The system of claim 1, wherein the first latch component body comprises a component of an information handling system.

10. The system of claim 1, wherein the displaceable latch member is displaceable in the outward direction away from the first latch component body between the unextended position and the extended position so as to enlarge the size of the latch member opening of the first latch component body.

11. The system of claim 1, wherein the latch member opening is defined in the first latch component body such that the opening is completely surrounded by the first latch component body.

12. The system of claim 1, further comprising an internal displacement surface defined on an internal side of the latch member; where the latch member opening is configured to provide clearance for application of force to the internal displacement surface from inside the latch member opening to displace the latch member in the outward direction away from the first latch component body.

13. The system of claim 12, where the latch reception opening is defined to provide clearance for insertion of a tool from the second side of the second latch component body to the first side of the second latch component body when the displaceable latch member is in its unextended position and is inserted into said latch reception opening from the first side of said second latch component body, so as to allow use of the tool to apply force to the internal displacement surface of the latch member from inside the latch member opening to pull the internal displacement surface of the latch member toward the second side of the second latch component body in the outward direction away from the first latch component body.

14. The system of claim 12, where the internal displacement surface of the latch member is positioned between the latch member opening and the first side of the second latch component body when the displaceable latch member is in its unextended position and is inserted into said latch reception opening from the first side of said second latch component body with said first latch extension surface of said displaceable latch member disposed adjacent said first latch retention surface of said latch reception opening and with said second latch extension surface of said displaceable latch member disposed adjacent said second latch retention surface of said latch reception opening.

15. A method of assembling together multiple components to form an assembly, comprising:
providing multiple separate components that are each configured for assembly as a separate component to another separate component of the multiple separate components to form an assembly, the multiple separate components including:
a first latch component body having a displaceable latch member provided on a first edge of said first latch component body with a latch member opening defined in said first latch component body adjacent said displaceable latch member, said displaceable latch member having a first latch extension surface provided on a first end of said displaceable latch member and a second latch extension surface provided on a second and opposite end of said displaceable latch member, said displaceable latch member being displaceable in an outward direction away from the first latch component body between an unextended position and an extended position so as to extend said first and second latch extension surfaces outwardly and away from each other, and
a second latch component body that is a separate latch component body from the first latch component body and that is configured for assembly as a separate component to said first latch component body to form an assembly of the first and second latch components bodies, the second latch component body having opposite first and second sides and having a latch reception opening defined to extend completely through the second latch component body from the first side of the latch component body to the second opposite side of the latch component body with a first latch retention surface provided on a first internal edge of said latch reception opening and a second latch retention surface provided on a second and opposite internal edge of said latch reception opening,
wherein said displaceable latch member of said first latch component body is configured to be insertable into said latch reception opening from the first side of said second latch component body when said displaceable latch member is disposed in said unextended position with said first latch extension surface of said displaceable latch member disposed adjacent said first latch retention surface of said latch reception opening and with said second latch extension surface of said displaceable latch member disposed adjacent said second latch retention surface of said latch reception opening, and
wherein said displaceable latch member is dimensioned to be latchably retained within said latch reception opening to prevent removal of said displaceable latch member in a direction outward from said first side of said second latch component body when said displaceable latch member is displaced in an outward direction away from the first latch component body from said unextended position to said extended position while inserted within said latch reception opening to extend said first latch extension surface of said displaceable latch member outwardly and away from said second latch extension surface such that said first latch extension surface latchably engages said first latch retention surface of said latch reception opening and said second latch extension surface latchably engages said second latch retention surface of said latch reception opening to latch said first latch component body to said separate second latch component body in assembled relationship;
inserting said displaceable latch member of said first latch component body into said latch reception opening from the first side of said second latch component body when said displaceable latch member is disposed in said unextended position such that said first latch extension surface of said displaceable latch member is disposed adjacent said first latch retention surface of said latch reception opening and such that said second latch extension surface of said displaceable latch member is disposed adjacent said second latch retention surface of said latch reception opening; and
displacing said displaceable latch member in an outward direction away from the first latch component body from said unextended position to said extended position while said displaceable latch member is inserted within said latch reception opening to extend said first latch extension surface of said displaceable latch member outwardly and away from said second latch extension surface such that said first latch extension surface latchably engages said first latch retention surface of said latch reception opening and said second latch extension surface latchably engages said second latch retention surface of said latch reception opening to prevent removal of said displaceable latch member in a direction outward from said first side of said second latch component body and to latch said first latch component body to said separate second latch component body in assembled relationship.

16. The method of claim 15, wherein first latch component body comprises a first substantially flat sheet metal component and said second latch component body comprises a second substantially flat sheet metal component; and wherein said method further comprises disposing a plane of said first substantially flat sheet metal component of said first latch component body perpendicular to a plane of said second substantially flat sheet metal component of said second latch component body when inserting said displaceable latch member of said first latch component body from said first side of said second latch component body into said latch reception opening of said second latch component body and when displacing said displaceable latch member to said extended position so that said first latch extension surface latchably engages said first latch retention surface of said latch reception opening and said second latch extension surface latchably engages said second latch retention surface of said latch reception opening to latch said first latch component body to said second latch component body with said plane of said first substantially flat sheet metal component of said first latch component body disposed perpendicular to said plane of said second substantially flat sheet metal component of said second latch component body.

17. The method of claim 15, wherein said method further comprises displacing said displaceable latch member of said first latch component body to said extended position such that it does not extend outwardly from said second side of said latch component body when said displaceable latch member is displaced to said extended position while inserted within said latch reception opening to latchably retain said displaceable latch member within said latch reception opening of said second latch component body.

18. The method of claim 15, wherein said displaceable latch member has a shape and dimensions complementary to a shape and dimensions of said latch reception opening such that said displaceable latch member is insertable into said latch reception opening when said displaceable latch member is disposed in said unextended position and only when said displaceable latch member is selectively oriented relative to said latch reception opening; and wherein said method further comprises selectively orienting said displaceable latch member relative to said latch reception opening prior to inserting said displaceable latch member of said first latch component body into said latch reception opening from said first side of said second latch component body.

19. The method of claim 18, wherein said latch reception opening is defined as an elongated slot having a first axis extending between said first and second latch retention surfaces; and wherein said displaceable latch member comprises an elongated displaceable member having a first axis extending between said first and second latch extension surfaces and having shape and dimensions complementary to said elongated slot of said latch reception opening such that said displaceable latch member is insertable into said latch reception opening when said displaceable latch member is disposed in said unextended position and only when said first axis of said elongated displaceable member of said displaceable latch member is aligned with said first axis of said elongated slot of said latch reception opening; and wherein said method further comprises selectively orienting said displaceable latch member relative to said latch reception opening so that said first axis of said elongated displaceable member is aligned with said first axis of said elongated slot prior to inserting said displaceable latch member of said first latch component body into said latch reception opening from said first side of said second latch component body.

20. The method of claim 19, wherein said second latch component body comprises the second side opposite said first side; wherein said latch reception opening is further defined to have at least one open side feature extending outwardly in a direction perpendicular to said first axis of said latch reception opening; and wherein said method further comprises performing said step of displacing said displaceable latch member to said extended position while said displaceable latch member is inserted within said latch reception opening by accessing and applying a displacement force to said displaceable latch member through said open side feature from said second side of said second latch component body.

21. The method of claim 15, wherein the first end of said displaceable latch member of said first latch component body is configured to be insertable into said latch reception opening from a first side of said second latch component body; wherein said first latch extension surface is defined on the first end of said displaceable latch member by a first latch extension opening and wherein said second latch extension surface is defined on the second and opposite end of said displaceable latch member by a second latch extension opening; wherein each of said first and second latch retention surfaces each comprise a chamfer surface being angled outwardly and away from said first side of said second latch component body toward the second and opposite side of said second latch component body such that an internal dimension of said latch reception opening is wider within said latch component body at said second side of said second latch component body than at said first side of said latch component body; and wherein said first and second latch extension surfaces are configured to extend outwardly and away from each other to latchably engage said chamfer surface of said respective first and second latch retention surfaces at a point between said first side and second sides of said second latch component body when said displaceable latch member is displaced to said extended position while inserted within said latch reception opening so as to latchably retain said latch displacement member within said latch reception opening to prevent removal of said displaceable latch member in a direction outward from said first side of said second latch component body.

22. The method of claim 15, wherein said first latch component body and said second latch component body each comprise components of an information handling system.

23. An assembly of multiple separate components that are each configured for assembly as a separate component to another separate component to form the assembly, the assembly comprising:
a first latch component body having a displaceable latch member provided on a first edge of said first latch component body with a latch member opening defined in said first latch component body adjacent said displaceable latch member, said displaceable latch member having a first latch extension surface provided on a first end of said displaceable latch member and a second latch extension surface provided on a second and opposite end of said displaceable latch member, said displaceable latch member being displaceable in an outward direction away from the first latch component body between an unextended position and an extended position so as to extend said first and second latch extension surfaces outwardly and away from each other; and
a second latch component body that is a separate latch component body from the first latch component body and that is configured for assembly as a separate component to said first latch component body to form an assembly of the first and second latch components bodies, the second latch component body having opposite first and second sides and having a latch reception opening defined to extend completely through the second latch component body from the first side of the latch component body to the second opposite side of the latch component body with a first latch retention surface provided on a first internal edge of said latch reception opening and a second latch retention surface provided on a second and opposite internal edge of said latch reception opening;
wherein said displaceable latch member of said first latch component body is positioned within said latch reception opening from the first side of said second latch component body and is latchably retained within said latch reception opening to prevent removal of said displaceable latch member in a direction outward from said first side of said second latch component body, said displaceable latch member being displaced in an outward direction away from the first latch component body from said unextended position to said extended position and said first latch extension surface of said displaceable latch member extending outwardly and away from said second latch extension surface so that said first latch extension surface latchably engages said first latch retention surface of said latch reception opening and so that said second latch extension surface latchably engages said second latch retention surface of said latch reception opening to latch said first latch component body to said separate second latch component body in assembled relationship.

24. The assembly of claim 23, wherein first latch component body comprises a first substantially flat sheet metal component of an information handling system; and wherein said second latch component body comprises a second substantially flat sheet metal component of an information handling system component; and wherein a plane of said first substantially flat sheet metal component is disposed perpendicular to a plane of said second substantially flat sheet metal component.

25. The assembly of claim 24, wherein said displaceable latch member has a shape and dimensions complementary to a shape and dimensions of said latch reception opening such that said displaceable latch member is insertable into said latch reception opening when said displaceable latch member is disposed in said unextended position and only when said displaceable latch member is selectively oriented relative to said latch reception opening; and wherein said displaceable latch member is positioned within said latch reception opening and is latchably retained in said selective orientation within said latch reception opening.

26. The assembly of claim 23, wherein the displaceable latch member is displaceable in the outward direction away from the first latch component body between the unextended position and the extended position so as to enlarge the size of the latch member opening of the first latch component body.

27. The assembly of claim 23, wherein the latch member opening is defined in the first latch component body such that the opening is completely surrounded by the first latch component body.

28. The assembly of claim 23, further comprising an internal displacement surface defined on an internal side of the latch member opening; and where the latch member opening is configured to provide clearance for application of force to the internal displacement surface from inside the latch member opening to displace the latch member in the outward direction away from the first latch component body.

29. The system of claim 28, where the latch reception opening is defined to provide clearance for insertion of a tool from the second side of the second latch component body to the first side of the second latch component body when the first latch component body is inserted into said latch reception opening of said second latch component body so as to allow use of the tool to apply force to the internal displacement surface of the latch member from inside the latch member opening to pull the internal displacement surface of the latch member toward the second side of the second latch component body in the outward direction away from the first latch component body.

30. The system of claim 28, where the internal displacement surface of the latch member is positioned between the latch member opening and the first side of the second latch component body when the displaceable latch member is in its unextended position and is inserted into said latch reception opening from the first side of said second latch component body with said first latch extension surface of said displaceable latch member disposed adjacent said first latch retention surface of said latch reception opening and with said second latch extension surface of said displaceable latch member disposed adjacent said second latch retention surface of said latch reception opening.

* * * * *